US012726286B2

(12) United States Patent
Chen

(10) Patent No.: US 12,726,286 B2
(45) Date of Patent: Sep. 1, 2026

(54) METHOD FOR SIGNAL PROCESSING, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 396 days.

(21) Appl. No.: 18/340,024

(22) Filed: Jun. 22, 2023

(65) Prior Publication Data

US 2023/0336260 A1 Oct. 19, 2023

Related U.S. Application Data

(63) Continuation of application No. PCT/CN2021/070643, filed on Jan. 7, 2021.

(51) Int. Cl.
*H04B 17/318* (2015.01)
*H04B 17/309* (2015.01)
*H04B 7/024* (2017.01)

(52) U.S. Cl.
CPC ......... *H04B 17/347* (2023.05); *H04B 17/318* (2015.01); *H04B 7/024* (2013.01)

(58) Field of Classification Search
CPC .... H04B 17/347; H04B 17/318; H04B 7/024; H04W 52/146; H04W 52/16; H04W 52/38; H04W 52/40; H04W 52/50; H04W 52/24; H04W 52/325; H04W 52/242; H04L 5/0053; H04L 5/0094; H04L 5/005
See application file for complete search history.

(56) References Cited

U.S. PATENT DOCUMENTS

2012/0129566 A1* 5/2012 Lee .................... H04W 52/245 455/522
2020/0145983 A1* 5/2020 Levitsky ............... H04L 5/0053
2020/0229103 A1* 7/2020 Hosseini ............... H04W 76/15
(Continued)

FOREIGN PATENT DOCUMENTS

CN 109151969 1/2019
CN 111727583 9/2020
CN 111786759 10/2020

OTHER PUBLICATIONS

3GPP TSG-RAN WG1 Meeting #102-e e-Meeting, Enhancements to multi-beam operation, Ericsson Aug. 17-28, 2020, R1-2005842 (Year: 2020).*

(Continued)

*Primary Examiner* — Edan Orgad
*Assistant Examiner* — Malick A Sohrab
(74) *Attorney, Agent, or Firm* — Hodgson Russ LLP

(57) ABSTRACT

A method for signal processing includes the following. A network device receives transmission configuration indication (TCI) state configuration information of a channel state information-reference signal (CSI-RS) from a network device, where the TCI state configuration information contains indication information of an SSB quasi co-located with the CSI-RS. The terminal device can determine transmit power of the CSI-RS according to a cell to which the SSB belongs.

18 Claims, 6 Drawing Sheets

(56) References Cited

U.S. PATENT DOCUMENTS

| | | | | |
|---|---|---|---|---|
| 2020/0351055 | A1 | 11/2020 | Manolakos et al. | |
| 2023/0092905 | A1* | 3/2023 | Zhang | H04W 36/0061 370/331 |
| 2023/0180141 | A1* | 6/2023 | Zhou | H04L 5/0048 455/522 |
| 2023/0246780 | A1* | 8/2023 | Li | H04L 5/0091 370/329 |

OTHER PUBLICATIONS

Intel Corporation, "Multi-TRP enhancements for inter-cell operation," 3GPP TSG RAN WG1 #103-e, R1-2008979, Oct. 2020.
"3rd Generation Partnership Project; Technical Specification Group Radio Access Network; NR; Physical layer procedures for data (Release 16)," 3GPP TS 38.214, Sep. 2020, v16.3.0.
Ericsson, "On inter-cell operation for mTRP," 3GPP TSG-RAN WG1 Meeting #102, Tdoc R1-2006368, Aug. 2020.
WIPO, International Search Report and Written Opinion for International Application No. PCT/CN2021/070643, Sep. 23, 2021.
Ericsson, "Enhancements to multi-beam operation," 3GPP TSG-RAN WG1 Meeting #102-e, Tdoc R1-2005842, Aug. 2020.
Vivo, "Discussion on multi-beam enhancement," 3GPP TSG RAN WG1 #102-e, R1-2005363, Aug. 2020.
EPO, Extended European Search Report for EP Application No. 21916769.9, Dec. 11, 2023.

* cited by examiner

METHOD FOR SIGNAL PROCESSING, TERMINAL DEVICE, AND NETWORK DEVICE

CROSS-REFERENCE TO RELATED APPLICATION(S)

This application is a continuation of International Application No. PCT/CN2021/070643, filed Jan. 7, 2021, the entire disclosure of which is incorporated herein by reference.

TECHNICAL FIELD

Implementations of the disclosure relate to the field of communication technology, and particularly to a method for signal processing, a terminal device, and a network device.

BACKGROUND

In the new radio (NR) system, downlink (DL) non-coherent transmission and uplink (UL) non-coherent transmission based on multiple transmission/reception points (TRPs) are introduced. In the DL non-coherent transmission, multiple TRPs can separately schedule, on the same physical resource, transmission of multiple data channels of a terminal device by using different control channels, or transmissions of different TRPs can be scheduled by using a same control channel. For DL transmission by using multiple control channels for scheduling, scheduled data channels can be transmitted in a same slot or different slots, and the terminal device also needs to support reception of control channels and data channels from different TRPs.

In the related art, in non-coherent transmission, the terminal device may perform UL or DL signal transmission with two different cells (serving cell and neighboring cell), where different signals may need to be transmitted to or be from different cells. If a UL signal is to be transmitted to a neighboring cell, it needs to perform path-loss measurement based on a synchronization signal block (SSB) or a channel state information-reference signal (CSI-RS) of the neighboring cell, to determine transmit power of the UL signal.

However, in the related art, transmit power of a CSI-RS is calculated according to an SSB of a serving cell. For a UL signal that needs to be transmitted to a neighboring cell, if the transmit power of the CSI-RS is calculated according to the SSB of the serving cell, there may be an error in calculated transmit power of the CSI-RS, resulting in low accuracy of path-loss measurement and power control.

SUMMARY

Implementations of the disclosure provide a method for signal processing, a terminal device, and a network device.

In a first aspect, implementations of the disclosure provide a method for signal processing. The method includes the following. Receive transmission configuration indication (TCI) state configuration information of a CSI-RS, where the TCI state configuration information contains indication information of an SSB quasi co-located with the CSI-RS. Determine transmit power of the CSI-RS according to a cell to which the SSB belongs.

In a second aspect, implementations of the disclosure provide a terminal device. The terminal device includes a transceiver, a memory storing computer-executable instructions, and a processor coupled to the transceiver and the memory and configured to execute the computer-executable instructions to enable the transceiver to receive TCI state configuration information of a CSI-RS, where the TCI state configuration information contains indication information of an SSB quasi co-located with the CSI-RS. The processor is further configured to execute the computer-executable instructions to determine transmit power of the CSI-RS according to a cell to which the SSB belongs.

In a third aspect, implementations of the disclosure provide a network device. The network device includes a transceiver, a memory storing computer-executable instructions, and a processor coupled to the transceiver and the memory and configured to execute the computer-executable instructions to enable the transceiver to transmit TCI state configuration information of a CSI-RS, where the TCI state configuration information contains indication information of an SSB quasi co-located with the CSI-RS, and is used to determine transmit power of the CSI-RS.

DETAILED DESCRIPTION

In order to describe purposes, technical solutions, and advantages in implementations of the disclosure more clearly, the following will give a clear and complete introduction to the technical solutions in the implementations of the disclosure in combination with accompanying drawings in the implementations of the disclosure. Apparently, the implementations hereinafter described are merely some rather than all implementations of the disclosure. Based on the implementations of the disclosure, all other implementations obtained by those of ordinary skill in the art without creative effort shall fall within the scope of protection of the disclosure.

The terms "first", "second" and the like used in the specification, the claims, and the accompany drawings of the implementations of the disclosure are used to distinguish similar objects rather than describe a particular order. It is to be understood that data so used are interchangeable under appropriate circumstances, such that the implementations of the disclosure described herein can be practiced in sequences other than those illustrated or described herein. In addition, the terms "include", "comprise", and "have" as well as variations thereof are intended to cover non-exclusive inclusion. For example, a process, method, system, product, or device including a series of steps or units is not necessarily limited to those steps or units explicitly listed, but may include steps or units not explicitly listed or inherent to the process, method, product, or device.

Figure 1:
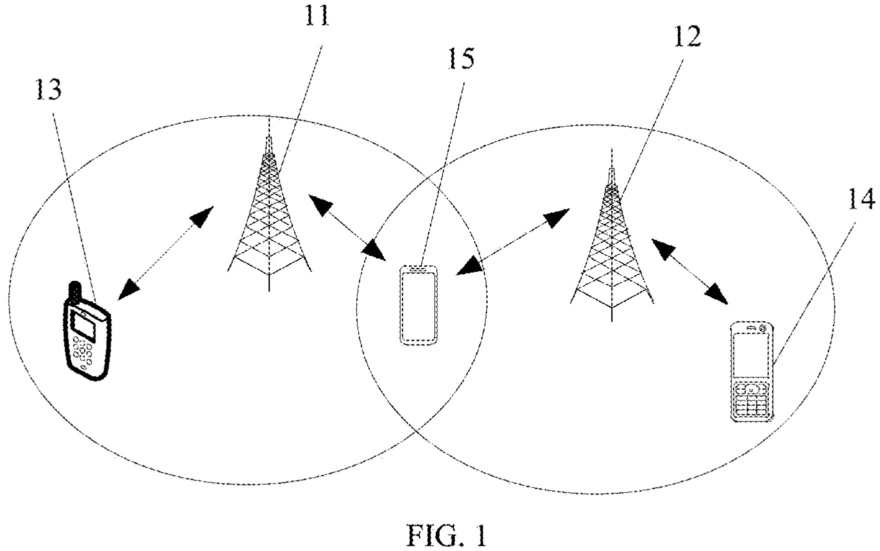
FIG. 1 is a schematic structural diagram of a communication system provide in implementations of the disclosure.

Methods for signal processing provided in the following implementations of the disclosure can be applicable to communication systems. FIG. 1 is a schematic structural diagram of a communication system provided in implementations of the disclosure. As illustrated in FIG. 1, the communication system may include a first network device 11, a second network device 12, and multiple terminal devices located within the coverage of the first network device 11 and/or the second network device 12. FIG. 1 exemplarily illustrates one first network device 11, one second network device 12, and terminal devices 13, 14, and 15. In the communication system in the implementation in FIG. 1, the first network device 11 can communicate with terminal devices within the coverage of the first network device 11, and the second network device 12 can communicate with terminal devices within the coverage of the second network device 12.

Optionally, in the implementation in FIG. 1, the terminal device 13 is located within the coverage of the first network device 11, the terminal device 14 is located within the coverage of the second network device 12, and the terminal device 15 is located within the coverage of the first network device 11 and the coverage of the second network device 12. Therefore, the terminal device 13 can transmit uplink (UL) data to the first network device 11, and can also receive downlink (DL) information transmitted by the first network device 11; the terminal device 14 can transmit UL data to the second network device 12, and can also receive DL information transmitted by the second network device 12; and the terminal device 15 can not only transmit UL data to the first network device 11, but also transmit UL data to the second network device 12, and can also receive DL information transmitted by the first network device 11 and/or the second network device 12. Which network device the terminal device 15 will communicate with may be determined according to actual needs, and details are not described herein.

Optionally, the communication system in the implementations is not limited to include network devices and terminal devices, as long as there are entities that can transmit information and entities that can receive information in the communication system, and the implementations of the disclosure is not limited thereto.

It can be understood that FIG. 1 is only a schematic diagram of the communication system, and the communication system may also include other network devices, such as a core network device, a wireless relay device, and a wireless backhaul device, or may include a network controller, a mobility management entity, and other network entities, and the implementations of the disclosure are not limited thereto.

The technical solutions in the implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), a wireless fidelity (WiFi), a next generation communication system, or other communication systems.

Generally, a conventional communication system supports a limited number of connections and therefore is easy to implement. However, with development of the communication technology, the mobile communication system can not only support conventional communication, but also support, for example, device to device (D2D) communication, machine to machine (M2M) communication, machine type communication (MTC), vehicle to vehicle (V2V) communication. The implementations of the disclosure also can be applied to these communication systems.

System architectures and service scenarios described in the implementations of the disclosure are intended to illustrate the technical solutions of the implementations of the disclosure more clearly and do not constitute a limitation to the technical solutions of the implementations of the disclosure. It is understood by those of ordinary skill in the art that the technical solutions of the implementations of the disclosure is equally applicable to similar technical problems as the network architectures evolve and new service scenarios emerge.

The network devices (the first network device and the second network device) involved in the implementations of the disclosure can provide wireless communication functions for the terminal devices, that is, the network device may be an entity for signal transmission or reception at the network side. The network device may be an ordinary base station (such as a Node B (NB), an evolutional Node B (eNB) or a next generation Node B (gNB)), a new radio controller (NR controller), a centralized unit, a new wireless base station, a radio remote module, a micro base station, a relay, a distributed unit, a transmission reception point (TRP), a transmission point (TP) or any other devices. There is no limitation on the specific technology and the specific device form adopted by the network device in the implementations of the disclosure. For convenience of illustration, the above devices that can provide wireless communication functions for the terminal devices are collectively referred to as network devices in the implementations of the disclosure.

In the implementations of the disclosure, the terminal device may be any terminal, for example, the terminal device may be a user equipment (UE) for machine-type communication. That is, the terminal device is also referred to as a UE, a mobile station (MS), a mobile terminal, or a terminal. The terminal device can perform communication with one or more core networks via a radio access network (RAN), for example, the terminal device may be a mobile phone (or referred to as a "cellular" radio telephone), a computer equipped with a mobile terminal, and the like. For example, the terminal device may also be a portable, pocket-sized, handheld, or a computer-built or vehicle-mounted mobile device that can exchange language and/or data with the RAN. The disclosure is not limited in this regard.

Optionally, the network devices and the terminal devices may be deployed on land, including indoor or outdoor, handheld or vehicle-mounted; on water; and also in the air, on aircraft, balloons and artificial satellites. There is no limitation on application scenarios of the network devices and the terminal devices in the implementations of the disclosure.

Optionally, communication between the network device and the terminal device and communication between the terminal devices can be performed via a licensed spectrum, via an unlicensed spectrum, or via both a licensed spectrum and an unlicensed spectrum. Communication between the network device and the terminal device and communication between the terminal devices can be performed via a spectrum below 7 gigahertz (GHz), via a spectrum above 7 GHz, or via both the spectrum below 7 GHz and the spectrum above 7 GHz. There is no limitation on spectrum resources used between the network device and the terminal device in the implementations of the disclosure.

It can be understood that, the terms "multiple" or "a plurality of" in the implementations of the disclosure indicate two or more than two. The term "and/or" describes an association relationship of associated objects, indicating that there may be three relationships, for example, A and/or B, which can indicate the existence of A alone, A and B together, and B alone. In addition, the character "/" generally indicates that associated objects are in an "or" relationship.

The following first introduces some related technologies involved in the implementations of the disclosure.

Quasi Co-Location (QCL) Indication for DL Transmission

Quasi-co-location refers to that for signals with same channel characteristics on different channels, it can be assumed that these signals are transmitted from a same transmission source. QCL configuration may include different types of signals, such as a channel state information-reference signal (CSI-RS), a synchronization signal block (SSB), or a sounding reference signal (SRS). The network device can configure corresponding QCL configuration for different beams. The network device can change a beam where the terminal device operates by changing QCL configuration of the terminal device.

In practical applications, the SSB is also called a synchronization signal (SS)/physical broadcast channel (PBCH) block (SS/PBCH block), which consists of a primary synchronization signal (PSS), a secondary synchronization signal (SSS), and a PBCH. In the implementations of the disclosure, the SS/PBCH block is equivalent to the SSB, and the following implementations are described with the SSB.

Transmission Configuration Indicator (TCI) State

In the communication system, the terminal device and the network device can perform information transmission. Specifically, when the terminal device receives a signal, the terminal device can improve a receiving algorithm according to characteristics of transmission environment corresponding to data transmission, thereby improving receiving performance. For example, the terminal device can optimize design and parameters of a channel estimator according to statistical properties of channels.

In the NR system, the characteristics of the transmission environment corresponding to data transmission can be indicated by QCL information for DL transmission. Specifically, the network device can configure a corresponding TCI state for each DL reference signal or DL channel, to indicate a QCL reference signal corresponding to a target DL reference signal or target DL channel, so that the terminal device can receive the target DL reference signal or the target DL channel according to the QCL reference signal.

In practical applications, if DL transmissions are from different beams or different panels or different TRPs, the characteristics of the transmission environment corresponding to data transmission may vary. Therefore, in the NR system, when the network side transmits a DL control channel or data channel, the network side may indicate corresponding QCL information to the terminal device via a TCI state, so that the terminal device can determine the characteristics of the transmission environment corresponding to DL transmission.

In an implementation, a TCI state can contain the following configuration information: an identifier (ID) of the TCI state; QCL information 1; and QCL information 2 (optional). The ID of the TCI state is used to identify the TCI state.

QCL information contains the following information: QLC type configuration, and QCL reference signal configuration.

The QCL type configuration may be QCL type A, QCL type B, QCL type C, or QCL type D. The QCL reference signal configuration may include an ID of a cell where a reference signal is located (specifically an ID of a carrier where the reference signal is located), an ID of a bandwidth part (BWP), and an ID of the reference signal.

Optionally, the ID of the reference signal may be an ID of a CSI-RS resource or an index of an SSB.

In an implementation, in the case where a TCI state is configured with both QCL information 1 and QCL information 2, the QCL type of one of QCL information 1 and QLC information 2 is required to be QCL type A, QCL type B, or QLC type C, and the QCL type of the other one of QCL information 1 and QCL information 2 is required to be QCL type D.

Optionally, different QCL type configurations are defined as follows.

'QCL-Type A': {Doppler shift, Doppler spread, average delay, delay spread}, that is, configuration information of QCL type A contains Doppler shift, Doppler spread, average delay, delay spread.

'QCL-Type B': {Doppler shift, Doppler spread}, that is, configuration information of QCL type B contains Doppler shift and Doppler spread.

'QCL-Type C': {Doppler shift, average delay}, that is, configuration information of QCL type C contains Doppler shift and average delay.

'QCL-Type D': {Spatial Rx parameter}, that is, configuration information of QCL type D contains Spatial Rx parameter.

In the NR system, the network side can configure a TCI state for a target DL signal or a target DL channel.

In a possible design, if the network side configures, via the TCI state, a QCL reference signal of the target DL channel or the target DL signal as a reference SSB or reference CSI-RS resource, and configures the QCL type as type A, type B or type C, then the terminal device can assume that the target DL signal is the same as the reference SSB or the reference CSI-RS resource in terms of large-scale parameters, and the large-scale parameters may be determined according to information in the QCL type configuration.

In another possible design, if the network side configures, via the TCI state, the QCL reference signal of the target DL channel or the target DL signal as the reference SSB or reference CSI-RS resource, and configures the QCL type as type D, then the terminal device can receive the target DL signal through a receive beam (Spatial Rx parameter) that is used for receiving the reference SSB or the reference CSI-RS resource. That is, at this point, the terminal device can determine a receive beam of the target DL signal according to the TCI state.

Usually, the target DL channel (or DL signal), and the reference SSB or the reference CSI-RS resource of the target DL channel (or DL signal) are transmitted by a same TRP, a same panel, or a same beam at the network side. If two DL signals or DL channels are transmitted by different TRPs, different panels, or different beams, different TCI states are usually configured.

In is to be understood that in the implementations of the present disclosure, the SSBs mentioned above are SSBs of a current serving cell.

For a physical downlink control channel (PDCCH), a TCI state corresponding to a control resource set (CORESET) can be indicated via radio resource control (RRC) signaling, or RRC signaling plus medium access control (MAC) signaling.

For a physical downlink shared channel (PDSCH), that is, a DL data channel, an available TCI-state set is indicated via RRC signaling, and some TCI states are activated via MAC layer signaling, and finally, one or two TCI states for a PDSCH scheduled by downlink control information (DCI) are indicated from the activated TCI states via a TCI state indication field in the DCI. The case of two TCI states is mainly for scenarios such as a scenario of multiple TRPs.

Optionally, a manner in which a TCI state is indicated is not limited in the implementations of the disclosure, which can be determined according to actual scenarios, and details will not be repeated here.

UL Beam Management

In NR, for each physical uplink control channel (PUCCH) resource, multiple PUCCH-spatialrelationinfo can be configured in RRC signaling, and available PUCCH-spatialrelationinfo in multiple PUCCH-spatialrelationinfo can be indicated via MAC layer signaling. Each PUCCH-spatialrelationinfo contains a reference signal for determining a transmit beam of a PUCCH, where the reference signal may be an SRS, a CSI-RS, or an SSB of a serving cell. If the reference signal is a CSI-RS or an SSB, the terminal device determines a receive beam of the CSI-RS or the SSB as the transmit beam of the PUCCH. If the reference signal is an SRS, the terminal device determines a transmit beam of the SRS as the transmit beam of the PUCCH.

It can be understood that each PUCCH-spatialrelationinfo may further contain a power control parameter (s) for the PUCCH, which is not repeated herein.

Optionally, for each SRS resource, corresponding SRS-spatialrelationinfo can also be configured via RRC signaling. The SRS-spatialrelationinfo contains a reference signal for determining a transmit beam of the SRS, where a manner in which the transmit beam of the SRS is determined is the same as the manner in which the transmit beam of the PUCCH is determined. Different from the PUCCH, if the SRS resource is for positioning, an SSB in the SRS-spatialrelationinfo may be an SSB of a neighboring cell.

Exemplarily, in the SRS-spatialrelationinfo, the reference signal for determining the transmit beam of the SRS may be a signal of a serving cell (configured via servingRS-r16), or an SSB of a neighboring cell (configured via SSB-Ncell-r16), or a positioning reference signal of DL (configured via dl-PRS-r16). When the reference signal is the SSB of the neighboring cell, the network device can further configure the SRS-spatialrelationinfo to further indicate a physical cell identifier (PCID) of the SSB (physicalCellId-r16), an index of the SSB (ssb-IndexNcell-r16), and resource information of the SSB (ssb-Configuration-r16), and the terminal device can perform neighboring-cell SSB detection according to these configurations, where each SRS-spatialrelationinfo needs to contain the information.

UL and DL Non-Coherent Transmission

In the NR system, UL and DL non-coherent transmission based on multiple TRPs are introduced. In the DL non-coherent transmission, multiple TRPs can separately schedule, on the same physical resource, transmission of multiple PDSCHs of a terminal device by using different control channels, or transmissions of different TRPs can be scheduled by using a same control channel.

For DL transmission by using multiple PDCCHs for scheduling, scheduled PDSCHs can be transmitted in a same slot or different slots, and the terminal device also needs to support reception of PDCCHs and PDSCHs from different TRPs.

Figure 2:
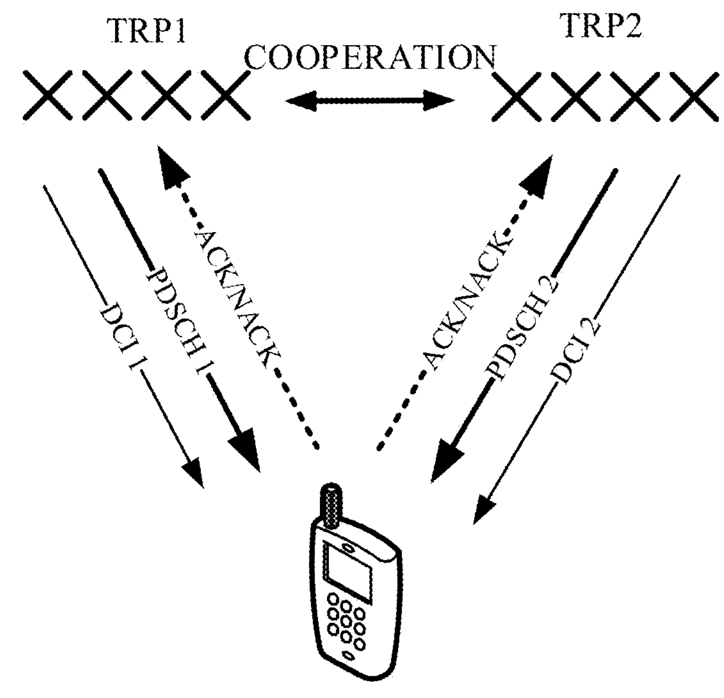
FIG. 2 is a schematic diagram illustrating downlink non-coherent transmission based on multiple TRPs.

Exemplarily, FIG. 2 is a schematic diagram illustrating DL non-coherent transmission based on multiple TRPs. In FIG. 2, the terminal device communicates with TRPs (TRP 1 and TRP 2). Specifically, in the schematic diagram of FIG. 2, TRP 1 and TRP 2 can cooperate with each other to support service operation of the terminal device. Specifically, both TRP 1 and TRP 2 can transmit DCI and a PDSCH to the terminal device and receive acknowledgement/non acknowledgement (ACK/NACK) information fed back by the terminal device. For example, TRP 1 transmits DCI 1 and PDSCH 1 to the terminal device and receive ACK/NACK fed back by the terminal device, and TRP 2 transmits DCI 2 and PDSCH 2 to the terminal device and receives ACK/NACK fed back by the terminal device.

It can be understood that TRP 1 and TRP 2 in FIG. 2 may be different TRPs of a same cell, or may be two different physical cells.

In the UL non-coherent transmission, different TRPs can separately schedule PUSCH transmission for a same terminal device. Transmission parameters such as a beam, a pre-coding matrix, and layer number can be separately configured for each of different PUSCH transmissions. PUSCH transmission scheduled by different TRPs can be transmitted in a same slot or different slots.

Figure 3:
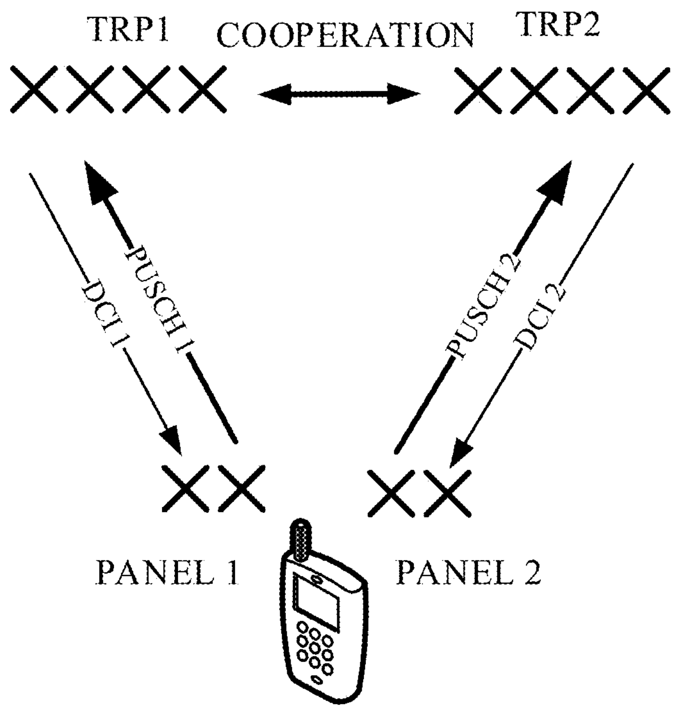
FIG. 3 is a schematic diagram illustrating uplink non-coherent transmission based on multiple TRPs.

Exemplarily, FIG. 3 is a schematic diagram illustrating UL non-coherent transmission based on multiple TRPs. In FIG. 3, the terminal device can communicate with two TRPs (TRP 1 and TRP 2). As illustrated in FIG. 3, UL non-coherent transmission is similar to DL non-coherent transmission. Different TRPs can schedule PUSCH transmission via multiple DCI, where the multiple DCI can be carried in different CORESETs. The two TRPs that cooperate with each other may be two different physical cells.

Specifically, referring to FIG. 3, TRP 1 can transmit DCI to the terminal device to schedule UL transmission of a PUSCH of the terminal device, and TRP 2 can transmit DCI to the terminal device to schedule UL transmission of a PUSCH of the terminal device. For example, TRP 1 transmits DCI 1 to the terminal device and receives PUSCH 1 transmitted by the terminal device, and TRP 2 transmits DCI 2 to the terminal device and receive PUSCH 2 transmitted by the terminal device. Correspondingly, the terminal device receives via panel 1 DCI 1 transmitted by TRP 1 and feeds back PUSCH 1, and the terminal device receives via panel 2 DCI 2 transmitted by TRP 2 and feeds back PUSCH 2.

As can be seen from FIG. 2 and FIG. 3, in non-coherent transmission, the terminal device can perform UL or DL signal transmission with two different cells (for example, a serving cell and a neighboring cell). Different signals may be transmitted to or from different cells. If a UL signal is to be transmitted to the neighboring cell, it needs to perform path-loss measurement according to an SSB or a CSI-RS of the neighboring cell, to determine transmit power of the UL signal.

However, in related art, transmit power of a CSI-RS is calculated according to an SSB of a serving cell. If path-loss measurement on a UL signal is performed according to a CSI-RS of a neighboring cell, there may be error in the transmit power of the CSI-RS calculated according to the SSB of the serving cell, thereby adversely affecting accuracy of path-loss measurement and power control.

To solve the above problems, implementations of the present disclosure provide a method for signal processing to determine transmit power of a CSI-RS. In the method, the terminal device can determine whether the CSI-RS is from a neighboring cell or a serving cell according to TCI state configuration information of the CSI-RS, to determine the transmit power of the CSI-RS in different manners. For example, when the CSI-RS is an CSI-RS of the neighboring cell, the terminal device can determine transmit power of an SSB of the neighboring cell according to neighboring-cell SSB configuration information, and then calculate transmit power of the CSI-RS of the neighboring cell, and thus path-loss measurement for the neighboring cell can be performed according to the CSI-RS of the neighboring cell, thereby supporting cooperation transmission of multiple cells, and accordingly improving accuracy of path-loss measurement and power control.

The following is an overview of the technical solutions of the disclosure.

1. The terminal device receives TCI state configuration information of a CSI-RS, where the TCI state configuration information indicates an SSB quasi co-located with the CSI-RS.

Optionally, the TCI state configuration information further indicates a PCID carried in the SSB.

2. The terminal device determines transmit power of the CSI-RS according to whether the SSB is an SSB of a serving cell or an SSB of a neighboring cell.

a) Specifically, the terminal device determines whether the SSB is the SSB of the serving cell or the SSB of the neighboring cell according to whether the PCID carried in the SSB is the same as a PCID of the serving cell or according to neighboring-cell indication information in the TCI state configuration information.

b) Specifically, when the SSB is the SSB of the serving cell, the terminal device determines the transmit power of the CSI-RS according to SSB transmit power in serving-cell configuration information and a power offset between the CSI-RS and the SSB.

c) Specifically, when the SSB is the SSB of the neighboring cell, the terminal device determines the transmit power of the SSB according to neighboring-cell SSB configuration information, and determine the transmit power of the CSI-RS according to the power offset between the CSI-RS and the SSB and the transmit power of the SSB.

The neighboring-cell SSB configuration information is pre-configured for the terminal device via higher-layer signaling.

In the step, there are mainly following manners in which the terminal device determines the transmit power of the SSB according to the neighboring-cell SSB configuration information.

The first manner is as follows. When the neighboring-cell SSB configuration information contains a power offset between a neighboring-cell SSB and a serving-cell SSB, the terminal device determines the transmit power of the SSB according to the power offset and the transmit power of the SSB of the serving cell.

The second manner is as follows. When the neighboring-cell SSB configuration information contains indication information of a frequency of the SSB, the terminal device determines the transmit power of the SSB according to the frequency, where different frequency bands correspond to different transmit power.

The third manner is as follows. When the neighboring-cell SSB configuration information contains indication information of a subcarrier spacing of the SSB, the terminal device determines the transmit power of the SSB according to the subcarrier spacing.

The fourth manner is as follows. When the neighboring-cell SSB configuration information contains indication information of a half frame where the SSB is located, the terminal device determines the transmit power of the SSB according to the half frame where the SSB is located, where an SSB in the first half-frame and an SSB in the second half-frame use different transmit power.

The fifth manner is as follows. When the neighboring-cell SSB configuration information contains indication information of a sub-frame where the SSB is located, the terminal device determines the transmit power of the SSB according to the sub-frame where the SSB is located, where SSBs in different sub-frames use different transmit power.

d) Specifically, when the SSB is the SSB of the neighboring cell, the terminal device determines an initial transmit power of the CSI-RS according to the SSB transmit power in the serving-cell configuration information and the power offset between the CSI-RS and the SSB, and determines the transmit power of the CSI-RS according to the initial transmit power of the CSI-RS and the power offset between the neighboring-cell SSB and the serving-cell SSB in the neighboring-cell SSB configuration information.

e) Furthermore, the terminal device determines a path-loss estimation value according to the transmit power of the CSI-RS and receive power of the CSI-RS.

In the above technical solution, when the terminal device is to transmit a UL signal to the neighboring cell, the terminal device can perform path-loss measurement according to the SSB or the CSI-RS of the neighboring cell, and thus transmit power of the UL signal can be accurately determined, thereby improving accuracy of power control.

The technical solution of the disclosure will be described in detail by means of specific implementations. It is to be noted that the technical solution of the disclosure can include some or all of the following content. The following specific implementations can be combined with each other, and same or similar concepts or processes may not be repeated in some implementations.

Figure 4:
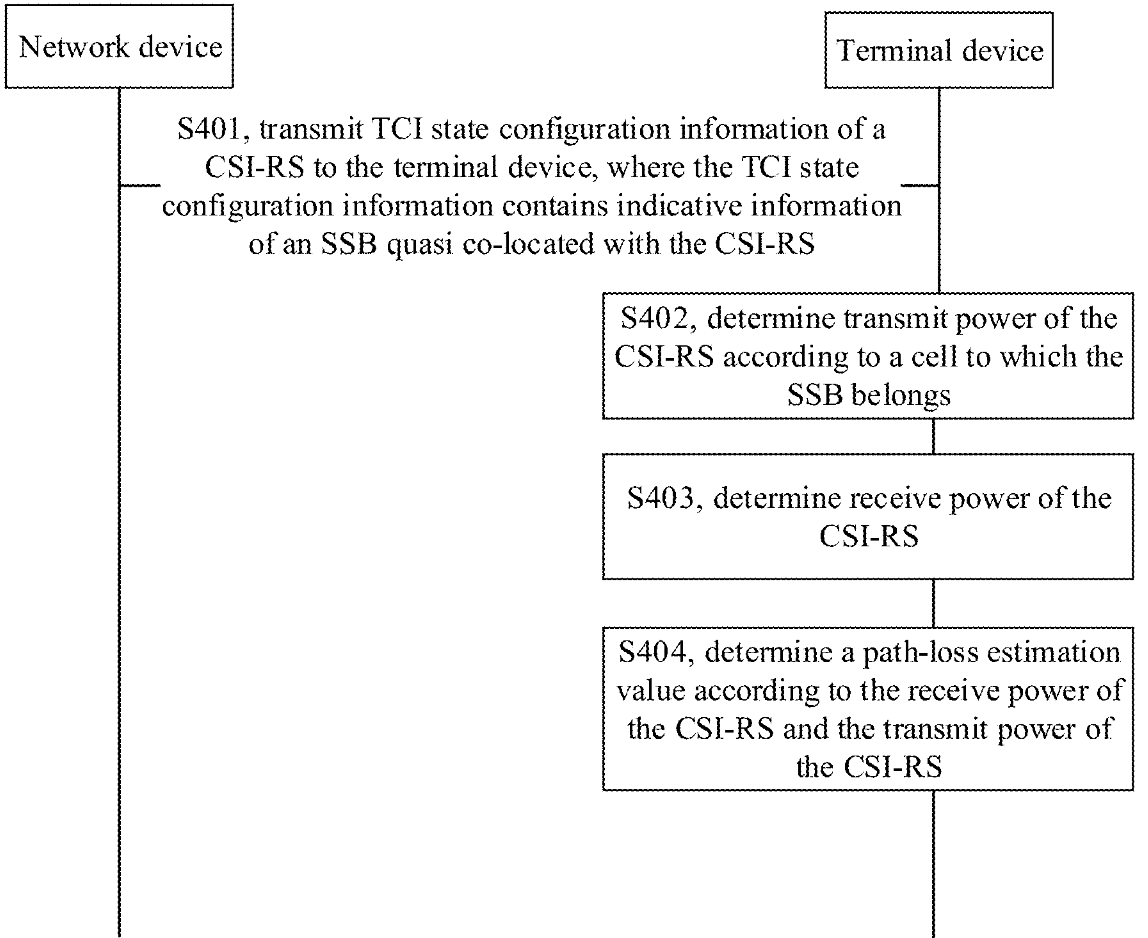
FIG. 4 is a schematic interactive diagram of implementation 1 of a method for signal processing provided in the disclosure.

FIG. 4 is a schematic interactive diagram of implementation 1 of a method for signal processing provided in the disclosure. The method is illustrated based on information interaction between a terminal device and a network device. Referring to FIG. 4, in the implementation, the method can include the following.

At S401, the network device transmits TCI state configuration information of a CSI-RS to the terminal device, where the TCI state configuration information contains indicative information of an SSB quasi co-located with the CSI-RS.

In actual application, when the network device performs information transmission with the terminal device, in order for that the terminal device can improve a receiving algorithm according to characteristics of transmission environment corresponding to data transmission to improve receiving performance when the terminal device receives a target DL signal or a target DL channel, the terminal device can configure a corresponding TCI state for each DL reference signal or each DL channel.

In the implementation of the disclosure, signals with same channel characteristics can be indicated via quasi co-location configuration information. Therefore, when the target DL signal is a CSI-RS, TCI state configuration information of the CSI-RS can contain indication information of an SSB quasi co-located with the CSI-RS, and thus the terminal device can receive the CSI-RS according to the indication information of the SSB.

Optionally, the TCI state configuration information can indicate to the terminal device via RRC signaling. Exemplarily, the indication information of the SSB in the TCI state configuration information may be an index of the SSB quasi co-located with the CSI-RS.

At S402, the terminal device determines transmit power of the CSI-RS according to a cell to which the SSB belongs.

Optionally, in the implementation of the disclosure, when the terminal device receives the TCI state configuration information of the CSI-RS, the terminal device can determine the SSB quasi co-located with the CSI-RS by parsing the TCI state configuration information, and then determine the transmit power of the CSI-RS according to whether the cell to which the SSB belongs is a serving cell for the terminal device or a neighboring cell for the serving cell, that is, whether the SSB is an SSB of the serving cell or an SSB of the neighboring cell.

In a possible design of the implementation of the disclosure, the TCI state configuration information further contains a PCID carried in the SSB, and the terminal device can determine the cell to which the SSB belongs according to the PCID carried in the SSB.

Exemplarily, when the PCID carried in the SSB is the same as a PCID of the serving cell, it is determined that the SSB is the SSB of the serving cell, and when the PCID carried in the SSB is different from the PCID of the serving cell, it is determined that the SSB is the SSB of the neighboring cell.

Specifically, the TCI state configuration information of the CSI-RS also indicates the PCID carried in the SSB quasi co-located with the CSI-RS, where the PCID may be a cell-ID of the serving cell or a cell-ID of the neighboring cell. Therefore, the terminal device can determine whether the SSB is the SSB of the serving cell or the SSB of the neighboring-cell according to whether the PCID carried in the SSB is the same as the PCID of the serving cell.

The PCID carried in the SSB may be carried in a synchronous signal of the SSB. The PCID of the serving cell can be carried in the SSB of the serving cell, or can also be determined during cell assess.

Therefore, in the implementation, if the PCID carried in the SSB is the same as the PCID of the serving cell, it can be determined that the SSB is the SSB of the serving cell, where the SSB of the serving cell is an SSB detected by the terminal device during a random access to the serving cell. If the PCID carried in the SSB is different from the PCID of the serving cell, it can be determined that the SSB is the SSB of the neighboring cell.

Correspondingly, in the possible design of the disclosure, the operation at S402 can be described as that the terminal device determines the transmit power of the CSI-RS according to whether the PCID carried in the SSB is the same as the PCID of the serving cell.

In another possible design of the implementations of the disclosure, the TCI state configuration information further contains neighboring-cell indication information, and the terminal device can determine the cell to which the SSB belongs according to the neighboring-cell indication information.

Specifically, the terminal device can determine whether the SSB is the SSB of the serving cell or the SSB of the neighboring cell according to the neighboring-cell indication information in the TCI state configuration information.

Exemplarily, 1-bit information in the TCI state configuration information can be used to indicate whether the SSB is the SSB of the serving cell or the SSB of the neighboring cell.

In actual application, ssb-configuration-r17 in the TCI state configuration information is used to configure a parameter(s) of the SSB of the neighboring cell, for example, the TCI state configuration information can contain the neighboring-cell indication information (physical cell) and/or an SSB-index.

In the step, the terminal device can determine the transmit power of the CSI-RS according to whether the SSB is the SSB of the serving cell or the SSB of the neighboring cell in one of the two possible manners described below.

A possible manner is as follows. When the SSB is the SSB of the serving cell, the terminal device determines the transmit power of the CSI-RS according to SSB transmit power in serving-cell configuration information and a power offset between the CSI-RS and the SSB. When the SSB is the SSB of the neighboring cell, the terminal device determines the transmit power of the SSB according to the neighboring-cell SSB configuration information, and then determines the transmit power of the CSI-RS according to the power offset between the CSI-RS and the SSB and the transmit power of the SSB. For detailed implementation of the possible manner, reference can be made to illustration of an implementation in FIG. 5, which will not be repeated herein.

Another possible manner is as follows. The terminal device determines an initial transmit power of the CSI-RS according to the SSB transmit power in the serving-cell configuration information and the power offset between the CSI-RS and the SSB. Further, when the SSB is the SSB of the serving cell, the initial transmit power is the transmit power of the CSI-RS. When the SSB is the SSB of the neighboring cell, the terminal device determines the transmit power of the CSI-RS according to the initial transmit power and a power offset between a neighboring-cell SSB and a serving-cell SSB in the neighboring-cell SSB configuration information. For detailed implementation of the possible manner, reference can be made to illustration of an implementation in FIG. 6, which will not be repeated herein.

Further, as illustrated in FIG. 4, in the method for signal processing provided in implementations of the disclosure, after the operation at S402, the method for signal processing may further include the following.

At S403, the terminal device determines receive power of the CSI-RS.

In the implementations of the disclosure, when the terminal device receives the CSI-RS transmitted by the network device, the terminal device can determine the receive power of the CSI-RS through measurement.

At S404, the terminal device determines a path-loss estimation value according to the receive power of the CSI-RS and the transmit power of the CSI-RS.

Optionally, after determining the transmit power of the CSI-RS according to the cell to which the SSB belongs and determining the receive power of the CSI-RS, the terminal device can calculate the path-loss estimation value of signal transmission, thereby providing the basis for accurate determination of transmission power of a UL signal.

Exemplarily, it is assumed that the transmit power of the CSI-RS is Pt (dBm) and the receive power of the CSI-RS is Pr (dBm), the path-loss estimation value is PL=Pr−Pt (dB), where dBm represents an absolute power value (0 dBm=1 mW), and the unit dB represents a relative value and is used to represent a comparative relationship between the transmit power of the CSI-RS and the receive power of the CSI-RS.

In the method for signal processing provided in the implementation of the disclosure, the terminal device transmits the TCI state configuration information of the CSI-RS to the terminal device, where the TCI state configuration information contains the indication information of the SSB quasi co-located with the CSI-RS, such that the terminal device can determine the transmit power of the CSI-RS according to the cell to which the SSB belongs, and then determine the path-loss estimation value according to the receive power of the CSI-RS and the transmit power of the CSI-RS. In the technical solution, in non-coherent transmission, the terminal device can accurately determine the transmit power of the CSI-RS, and thus can determine the path-loss estimation value accurately, thereby providing an implementation premise for accurate power control of UL signals.

Figure 5:
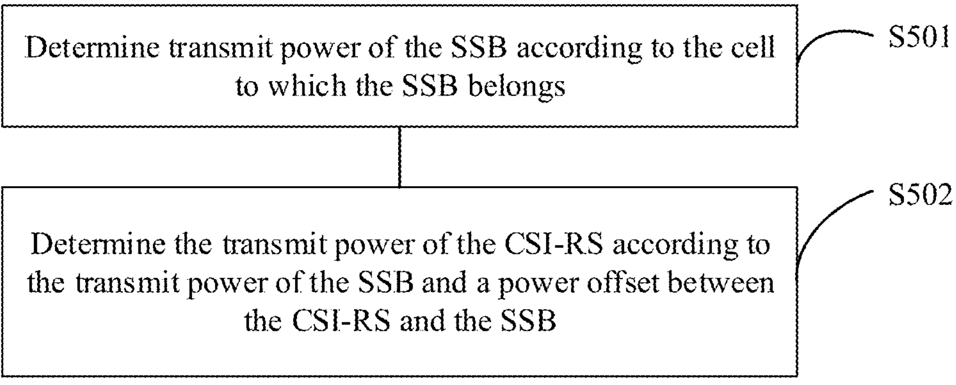
FIG. 5 is a schematic flow chart of implementation 2 of a method for signal processing provided in the disclosure.

In an example, on the basis of the implementation illustrated in FIG. 4, FIG. 5 is a schematic flow chart of implementation 2 of a method for signal processing provided in the disclosure. Referring to FIG. 5, in the implementation, the operation at block S202 can be implemented as follows.

At S501, determine the transmit power of the SSB according to the cell to which the SSB belongs.

In the implementation of the disclosure, the terminal device firstly determines the cell to which the SSB belongs, and then determines the transmit power of the SSB.

In an example, when the SSB is the SSB of the serving cell, the terminal device can determine the transmit power of the SSB from the serving-cell configuration information.

Specifically, the serving-cell configuration information is pre-configured for the terminal device by the network device, where the serving-cell configuration information contains the transmit power of the SSB of the serving cell. Therefore, when the terminal device determines that the SSB is the SSB of the serving cell, the terminal device can determine the transmit power of the SSB by querying the serving-cell configuration information.

In another example, when the SSB is the SSB of the neighboring cell, the terminal device can determine the transmit power of the SSB according to the neighboring-cell SSB configuration information.

In the implementation, the neighboring-cell SSB configuration information is pre-configured for the terminal device by the network device via higher-layer signaling, and the transmit power of the SSB can be determined in different manners when the neighboring-cell SSB configuration information contains different information.

In the first possible design of the implementation of the present disclosure, when the neighboring-cell SSB configuration information contains the power offset between the neighboring-cell SSB and the serving-cell SSB, the operation at S501 can be implemented as follows. Determine the transmit power of the SSB according to the power offset between the neighboring-cell SSB and the serving-cell SSB and the transmit power of the SSB of the serving cell.

Specifically, when the terminal device determines that the SSB is the SSB of the neighboring cell and the neighboring-cell SSB configuration information contains the power offset between the neighboring-cell SSB and the serving-cell SSB, on one hand, the terminal device determines the power offset between the neighboring-cell SSB and the serving-cell SSB from the neighboring-cell SSB configuration information, on the other hand, the terminal device determines the transmit power of the SSB of the serving cell from the serving-cell configuration information, and then determines the transmit power of the SSB according to the power offset between the neighboring-cell SSB and the serving-cell SSB and the transmit power of the SSB of the serving cell.

For example, if the transmit power of the SSB of the serving cell is Ps (dBm), and the power offset between the neighboring-cell SSB and the serving-cell SSB is Po (dB), then the transmit power of the SSB is Pn=Ps+Po (dBm), or the transmit power of the SSB is Pn=Ps−Po (dBm).

It is understood that the specific calculation formula for the transmit power of the SSB can be determined according to the configuration configured by the network device or an agreement, which will not be discussed in detail here.

In the second possible design of the implementation of the disclosure, when the neighboring-cell SSB configuration information contains indication information of a frequency of the SSB, the operation at S501 can be implemented as follows. Determine the transmit power of the SSB according to a frequency band where the SSB is located, where different frequency bands correspond to different transmit power.

Specifically, when the terminal device determines that the SSB is the SSB of the neighboring cell and the neighboring-cell SSB configuration information contains the indication information of the frequency of the SSB, the terminal device can determine the transmit power of the SSB according to the frequency band to which the frequency of the SSB belongs, where SSBs in different frequency bands use different transmit power.

In an example, an SSB transmitted in a frequency range 1 (FR1) frequency band and an SSB transmitted in a frequency range 2 (FR2) frequency band may use different transmit power. The FR1 frequency band generally refers to a low frequency band. Optionally, the FR1 frequency band includes spectrums occupied by the second generation (2G), the third generation (3G), and the fourth generation (4G) mobile communication systems, as well as some new spectrums. In the fifth generation (5G) network, the FR1 frequency band has a frequency range of 450 MHz-6 GHz, also known as a sub-6 GHz frequency band. The FR2 frequency band usually refers to a relatively high frequency band. In the 5G network, the FR2 frequency band has a frequency range of 24.25 GHz to 52.6 GHz, commonly referred to as millimeter wave (mmWave).

In another example, 28 GHz can be used as a critical frequency for different transmit power used for SSBs, that is, an SSB transmitted in the 28 GHz frequency band, an SSB transmitted in a frequency band above 28 GHz, and an SSB transmitted in a frequency band below 28 GHz may use different transmit power.

In the third possible design of the implementation of the disclosure, when the neighboring-cell SSB configuration information contains indication information of a subcarrier spacing of the SSB, the operation at block S501 can be implemented as follows. Determine the transmit power of the SSB according to the subcarrier spacing of the SSB.

Specifically, when the terminal device determines that the SSB is the SSB of the neighboring cell and the neighboring-cell configuration information contains the indication information of the subcarrier spacing of the SSB, the terminal device can determine the subcarrier spacing of the SSB according to the indication information of the subcarrier spacing of the SSB, and then determine the transmit power of the SSB according to the subcarrier spacing of the SSB.

In the NR system, the value of the subcarrier spacing is relatively flexible. Optional subcarrier spacing may be 15 KHz, 30 KHz, 60 KHz, 120 KHz, and 240 KHz. In practical applications, at least one of 30 KHz, 60 KHz, or 120 KHz can be selected as a critical subcarrier spacing for different transmit power, or each optional subcarrier spacing may correspond to one transmit power, which is not limited in the disclosure.

For example, when 30 KHz is selected as the critical subcarrier spacing for different transmission power, an SSB using a subcarrier spacing of 30 KHz or a subcarrier spacing below 30 KHz and an SSB using a subcarrier spacing above 30 KHz may use different transmit power, and each of different subcarrier-spacing ranges is configured with determined transmit power. Therefore, when the subcarrier spacing of the SSB is determined, the transmit power of the SSB can be determined.

In the fourth possible design of the implementation of the disclosure, when the neighboring-cell SSB configuration information contains the indication information of a half frame where the SSB is located, the operation at S501 can be implemented as follows. Determine the transmit power of the SSB according to the half frame where the SSB is located, where an SSB in the first half-frame and an SSB in the second half-frame use different transmit power.

Specifically, when the terminal device determines that the SSB is the SSB of the neighboring cell and the neighboring-cell SSB configuration information contains the indication information of the half frame where the SSB is located, the terminal device can determine the transmit power of the SSB by determining whether the SSB is located in the first half-frame or the second half-frame according to the indication information of the half frame where the SSB is located, where an SSB in the first half-frame and an SSB in the second half-frame use different transmit power, that is, the transmit power of the SSB is related to the half frame where the SSB is located.

In the fifth possible design of the implementation of the disclosure, when the neighboring-cell SSB configuration information contains indication information of a sub-frame where the SSB is located, the operation at S501 can be implemented as follows. Determine the transmit power of the SSB according to the sub-frame where the SSB is located, where SSBs in different sub-frames use different transmit power.

Specifically, when the terminal device determines that the SSB is the SSB of the neighboring cell and the neighboring-cell SSB configuration information contains the indication information of the sub-frame where the SSB is located, the terminal device determines the sub-frame where the SSB is located according to the indication information of the sub-frame where the SSB is located, and then determines the transmit power of the SSB according to the sub-frame where the SSB is located, where SSBs in different sub-frames use different transmit power, that is, transmit power of the SSB is related to the sub-frame where the SSB is located.

At S502, determine the transmit power of the CSI-RS according to the transmit power of the SSB and the power offset between the CSI-RS and the SSB.

In the implementation of the disclosure, when the terminal device determines that the SSB is the SSB of the neighboring cell and determines the transmit power of the SSB according to the neighboring-cell SSB configuration information, the terminal device can obtain the power offset between the CSI-RS and the SSB, and then determine the transmit power of the CSI-RS according to the power offset between the CSI-RS and the SSB and the determined transmit power of the SSB.

The power offset between the CSI-RS and the SSB can be configured for the terminal device via CSI-RS resource configuration information of the CSI-RS.

For example, assuming that the transmit power of the SSB is Pn (dBm) and the power offset between the CSI-RS and the SSB is Pd (dB), then the transmit power of the CSI-RS is Pt=Pn+Pd (dBm).

It can be understood that the terminal device can also determine the transmit power Pt of the CSI-RS according to other relationships between Pn and Pd, such as Pt=Pn−Pd (dBm). The specific manner in which the transmit power Pt of the CSI-RS is determined can be determined based on the actual configuration configured by the network device or an agreement, which will not be discussed here.

In the method for signal processing in the implementation of the disclosure, the terminal device determines the transmit power of the SSB (the transmit power of the SSB of the serving cell or the transmit power of the SSB of the neighboring cell) according to the cell to which the SSB belongs, and then determines the transmit power of the CSI-RS in combination with the power offset between the CSI-RS and the SSB. In the technical solution, the terminal device can accurately determine the transmit power of the CSI-RS, providing a basis for subsequent accurate path-loss measurement and power control.

Figure 6:
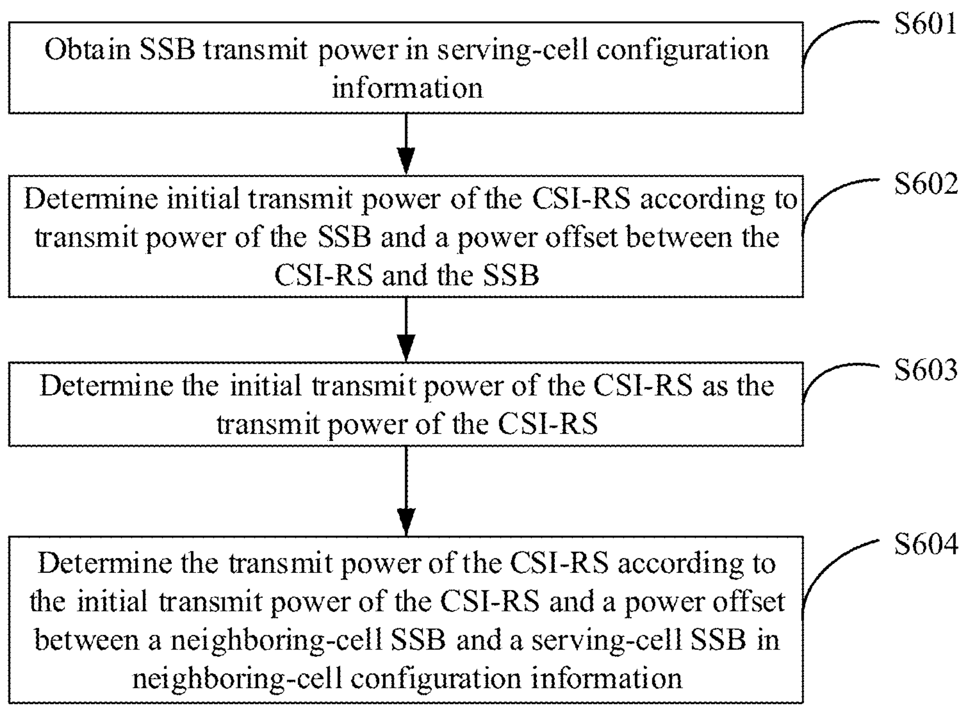
FIG. 6 is a schematic flow chart of implementation 3 of a method for signal processing provided in the disclosure.

In an example, on the basis of the implementation in FIG. 4, FIG. 6 is a schematic flow chart of implementation 3 of the method for signal processing provided in the disclosure. Referring to FIG. 6, in the implementation, the method for signal processing may further includes the following.

At S601, obtain SSB transmit power in the serving-cell configuration information.

In the implementation of the disclosure, when the terminal device receives the CSI-RS, the terminal device first determines the SSB transmit power from the serving-cell configuration information configured for the terminal device by the network device, that is, the transmit power of the SSB of the serving cell.

At S602, determine initial transmit power of the CSI-RS according to the transmit power of the SSB and the power offset between the CSI-RS and the SSB.

Optionally, the terminal device can receive the CSI-RS resource configuration information of the CSI-RS from the network device, where the CSI-RS resource configuration information contains the power offset between the CSI-RS and the SSB. Therefore, the terminal device can calculate the initial transmit power of the CSI-RS after obtaining the power offset between the CSI-RS and the SSB from the CSI-RS configuration information and the SSB transmit power from the serving-cell configuration information.

Exemplarily, assuming that the SSB transmit power in the serving-cell configuration information is Ps (dBm), and the power offset between the CSI-RS and the SSB obtained from the CSI-RS resource configuration information is Pd (dB), the initial transmit power of the CSI-RS is Pc=Ps+Pd (dBm) or Pc=Ps−Pd (dBm). The specific manner in which the initial transmit power of the CSI-RS is determined can be determined according to actual configuration or an agreement, which will not be repeated here.

Correspondingly, in the implementation, the terminal device can determine the transmit power of the CSI-RS according to the cell to which the SSB belongs as follows.

In an example, when the SSB is the SSB of the serving cell, the operation at S202 can be implemented by the operation at S603. At S603, determine the initial transmit power of the CSI-RS as the transmit power of the CSI-RS.

In the implementation of the disclosure, when the SSB is the SSB of the serving cell, the CSI-RS is a CSI-RS configured for the serving cell by the network device. Therefore, the initial transmit power of the CSI-RS is the transmit power of the CSI-RS.

Accordingly, on the basis of the operation at S602, when the SSB is the SSB of the serving cell, the transmit power of the CSI-RS is Pc=Ps+Pd (dBm) or Pc=Ps−Pd (dBm).

In another example, when the SSB is the SSB of the neighboring cell, the operation at S202 can be implemented by the operation at S604. At S604, determine the transmit power of the CSI-RS according to the initial transmit power of the CSI-RS and the power offset between the neighboring-cell SSB and the serving-cell SSB in the neighboring-cell SSB configuration information.

Exemplarily, when the SSB is the SSB of the neighboring cell, the terminal device can obtain the power offset between the neighboring-cell SSB and the serving-cell SSB from the neighboring-cell SSB configuration information, where the power offset between the neighboring-cell SSB and the serving-cell SSB can be determined as a power offset between a neighboring-cell CSI-RS and a serving-cell CSI-RS. Therefore, in the implementation, the terminal device can determine the transmit power of the CSI-RS according to the initial transmit power of the CSI-RS and the power offset between the neighboring-cell SSB and the serving-cell SSB in the neighboring-cell SSB configuration information.

For example, on the basis of the operation at S602, in the case where the power offset between the neighboring-cell SSB and the serving-cell SSB in the neighboring-cell SSB configuration information is Po (dB), when the SSB is the SSB of the neighboring cell, the transmit power of the CSI-RS is Pt=Pc+Po, or the transmit power of the CSI-RS is Pt=Pc−Po.

Specifically, when the initial transmit power of the CSI-RS is Pc=Ps+Pd (dBm), the transmit power of the CSI-RS is Pt=Pc+Po=Ps+Pd+Po or Pt=Pc−Po=Ps+Pd−Po. When the initial transmit power of the CSI-RS is Pc=Ps−Pd (dBm), the transmit power of the CSI-RS is Pt=Pc+Po=Ps−Pd+Po or Pt=Pc−Po=Ps−Pd−Po.

The specific calculation formula for Pt can be determined based on the actual configuration or an agreement, which will not be discussed here.

In the method for signal processing provided in the implementation of the disclosure, the terminal device obtains the SSB transmit power from the serving-cell configuration information, determines the initial transmit power of the CSI-RS according to the SSB transmit power and the power offset between the CSI-RS and the SSB, and then determines the initial transmit power of the CSI-RS as the transmit power of the CSI-RS when the SSB is the SSB of the serving cell, and determines transmit power of the CSI-RS according to the initial transmit power of the CSI-RS and the power offset between the neighboring-cell SSB and the serving-cell SSB in the neighboring-cell SSB configuration information when the SSB is the SSB of the neighboring cell. With the technical solution, the terminal device can also accurately determine the transmit power of the CSI-RS, providing a basis for subsequent accurate path-loss measurement and power control.

The above illustrates detailed implementation of the methods for signal processing in the implementations of the disclosure. The following illustrates apparatus implementations in the disclosure, which can be used to execute the method implementations in the disclosure. For details not disclosed in the apparatus implementations of the disclosure, reference can be made to the method implementations in the disclosure.

Figure 7:
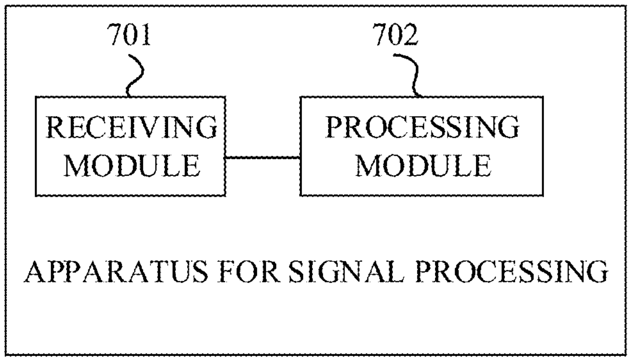
FIG. 7 is a schematic structural view of an implementation of an apparatus for signal processing provided in the disclosure.

FIG. 7 is a schematic structural diagram of an implementation of an apparatus for signal processing in the disclosure. The apparatus can be integrated in a terminal device or can be implemented by the terminal device. As illustrated in FIG. 7, the apparatus for signal processing includes a receiving module 701 and a processing module 702.

The receiving module 701 is configured to receive TCI state configuration information of a CSI-RS, where the TCI state configuration information contains indication information of an SSB quasi co-located with the CSI-RS. The processing module 702 is configured to determine transmit power of the CSI-RS according to a cell to which the SSB belongs.

In a possible design of the implementations of the disclosure, the TCI state configuration information further contains a PCID carried in the SSB. The processing module 702 is further configured to determine the cell to which the SSB belongs according to the PCID carried in the SSB.

Optionally, the processing module 702 configured to determine the cell to which the SSB belongs according to the PCID carried in the SSB is configured to determine that the SSB is an SSB of a serving cell when the PCID carried in the SSB is the same as a PCID of the serving cell, or determine that the SSB is an SSB of a neighboring cell when the PCID carried in the SSB is different from the PCID of the serving cell.

In another possible design of the implementations of the disclosure, the TCI state configuration information further contains neighboring-cell indication information, and the processing module 702 is configured to determine the cell to which the SSB belongs according to the neighboring-cell indication information.

In yet another possible implementation of the implementations of the disclosure, the processing module 702 configured to determine the transmit power of the CSI-RS according to the cell to which the SSB belongs is configured to determine transmit power of the SSB according to the cell to which the SSB belongs, and determine the transmit power of the CSI-RS according to the transmit power of the SSB and a power offset between the CSI-RS and the SSB.

Optionally, the processing module 702 configured to determine the transmit power of the SSB according to the cell to which the SSB belongs is configured to determine the transmit power of the SSB from serving-cell configuration information when the SSB is the SSB of the serving cell, or determine the transmit power of the SSB according to the neighboring-cell configuration information when the SSB is the SSB of the neighboring cell.

In an example, the processing module 702 configured to determine the transmit power of the SSB according to the neighboring-cell SSB configuration information is configured to determine the transmit power of the SSB according to a power offset between a neighboring-cell SSB and a serving-cell SSB and the transmit power of the SSB of the serving cell when the neighboring-cell SSB configuration information contains the power offset between the neighboring-cell SSB and the serving-cell SSB.

In another example, the processing module 702 configured to determine the transmit power of the SSB according to the neighboring-cell SSB configuration information is configured to determine the transmit power of the SSB according to a frequency band where a frequency of the SSB is located when the neighboring-cell SSB configuration information contains indication information of the frequency of the SSB, where different frequency bands correspond to different transmit power.

In yet another example, the processing module 702 configured to determine the transmit power of the SSB according to the neighboring-cell SSB configuration information is configured to determine the transmit power of the SSB according to a subcarrier spacing of the SSB when the neighboring-cell SSB configuration information contains indication information of the subcarrier spacing of the SSB.

In yet another example, the processing module 702 configured to determine the transmit power of the SSB according to the neighboring-cell SSB configuration information is configured to determine the transmit power of the SSB according to a half frame where the SSB is located when the neighboring-cell SSB configuration information contains indication information of the half frame where the SSB is located, where an SSB in a first half-frame and an SSB in a second half-frame use different transmit power.

In yet another example, the processing module 702 configured to determine the transmit power of the SSB according to the neighboring-cell SSB configuration information is configured to determine the transmit power of the SSB according to a sub-frame where the SSB is located when the neighboring-cell SSB configuration information contains indication information of the sub-frame where the SSB is located, where SSBs in different sub-frames use different transmit power.

In another possible design of the implementations of the disclosure, the processing module 702 is further configured to obtain SSB transmit power in the serving-cell configuration information, and determine initial transmit power of the CSI-RS according to the SSB transmit power and a power offset between the CSI-RS and the SSB.

Optionally, the processing module 702 configured to determine the transmit power of the CSI-RS according to the cell to which the SSB belongs is configured to determine initial transmit power of the CSI-RS as the transmit power of the CSI-RS, when the SSB is the SSB of the serving cell, or determine the transmit power of the CSI-RS according to the initial transmit power of the CSI-RS and a power offset between a neighboring-cell SSB and a serving-cell SSB in the neighboring-cell SSB configuration information, when the SSB is the SSB of the neighboring cell.

In yet another possible design of the implementations of the disclosure, the processing module 702 is further configured to determine receive power of the CSI-RS, and determine a path-loss estimation value according to the receive power of the CSI-RS and the transmit power of the CSI-RS.

The apparatus for signaling processing in the implementations is used to perform the technical salutation at the terminal device side in the method implementations mentioned above, where implementation principle and technical effects are similar, and details will not be repeated in this regard.

Figure 8:
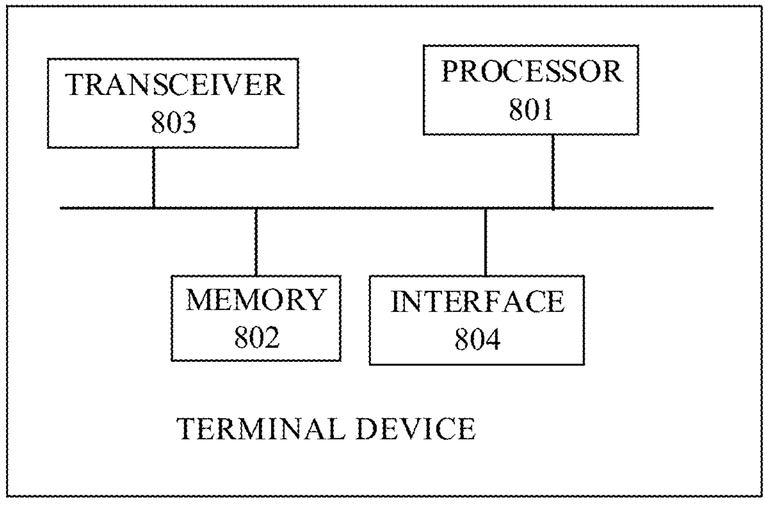
FIG. 8 is a schematic structural view of an implementation of a terminal device provided in the disclosure.

FIG. 8 is a schematic structural diagram of an implementation of a terminal device provided in the disclosure. As illustrated in FIG. 8, the terminal device may include a processor 801, a memory 802, a transceiver 803, and an interface 804 configured to communicate with a network device.

The memory 802 stores computer-executable instructions. The processor 801 is configured to execute the computer-executable instructions in the memory to enable the processor 801 to perform the technical solution at the terminal device side in the method implementations mentioned above.

Further, the implementations of the disclosure may further provide a communication system, where the communication system may include the terminal device and the network device.

The terminal device may include the apparatus for signal processing in FIG. 7 or the terminal device in FIG. 8, and the terminal device is used to implement the technical solutions of the foregoing method implementations.

It can be understood that the communication system may also include other devices, which may be determined according to actual scenarios, and details are not repeated here.

The present disclosure further provides a computer-readable storage medium, where computer-executable instructions are stored in the computer-readable storage medium, and the computer-executable instructions are executable by the processor to implement the technical solutions at the terminal device side in the foregoing method embodiments.

The implementations of the disclosure further provide a program, and the program is executable by the processor to implement the technical solutions at the terminal device side in the foregoing method implementations.

The implementations of the disclosure further provide a computer program product that includes a computer program, and the computer program is executable by the processor to implement the technical solutions at the terminal device side in the foregoing method implementations.

The implementations of the disclosure further provide a chip that includes a processing module and a communication interface, where the processing module is able to execute the technical solutions at the terminal device side in the foregoing method implementations.

Further, the chip further includes a storage module (such as a memory). The storage module is configured to store instructions, and the processing module is configured to execute the instructions stored in the storage module, and execution of the instructions stored in the storage module enables the processing module to perform the technical solutions at the terminal device side in the forgoing method implementations.

It will be appreciated that the systems, apparatuses, and methods disclosed in the implementations of the disclosure may also be implemented in other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices, or units, and may be electrical, mechanical, or otherwise.

In the above specific implementation of the network device and the terminal device, it is to be understood that the processor may be a central processing unit (CPU for short), and may also be other general-purpose processor, a digital signal processor (DSP for short), an application specific integrated circuit (ASIC for short), etc. The general-purpose processor may be a microprocessor, or the processor may be any conventional processor, or the like. The steps of the methods disclosed in the disclosure can be directly implemented by a hardware processor, or implemented by a combination of hardware and software modules in the processor.

All or part of the steps of the above method implementations can be completed by a program instructing related hardware. The aforementioned program can be stored in a readable memory. When the program is executed, the steps of the above-mentioned method implementations can be executed; and the aforementioned memory (storage medium) may include: a read-only memory (ROM), a random access memory (RAM), a flash memory, a hard disk, a solid-state disk, a magnetic tape, a floppy disk, an optical disc, and any combination thereof.

What is claimed is:

1. A method for signal processing, the method being executed by a terminal device and comprising:

receiving transmission configuration indication (TCI) state configuration information of a channel state information-reference signal (CSI-RS), the TCI state configuration information containing indication information of a synchronization signal block (SSB) quasi co-located with the CSI-RS; and determining transmit power of the CSI-RS according to a cell to which the SSB belongs;

wherein determining the transmit power of the CSI-RS according to the cell to which the SSB belongs comprises:

determining transmit power of the SSB from serving-cell configuration information when the SSB is an SSB of a serving cell, and determining the transmit power of the SSB according to neighboring-cell SSB configuration information when the SSB is an SSB of a neighboring cell, wherein the transmit power of the SSB is configured through the neighboring-cell SSB configuration information; and determining the transmit power of the CSI-RS according to the transmit power of the SSB and a power offset between the CSI-RS and the SSB;

wherein the method further comprises:

determining receive power of the CSI-RS, wherein the receive power of the CSI-RS is determined through measurement; and determining a path-loss estimation value according to the receive power of the CSI-RS and the transmit power of the CSI-RS.

2. The method of claim 1, wherein the TCI state configuration information further contains neighboring-cell indication information, and the method further comprises:

determining the cell to which the SSB belongs according to the neighboring-cell indication information.

3. The method of claim 1, wherein when the neighboring-cell SSB configuration information contains a power offset between a neighboring-cell SSB and a serving-cell SSB, determining the transmit power of the SSB according to the neighboring-cell SSB configuration information comprises:

determining the transmit power of the SSB according to the power offset between the neighboring-cell SSB and the serving-cell SSB and the transmit power of the SSB of the serving cell.

4. The method of claim 1, wherein when the neighboring-cell SSB configuration information contains indication information of a frequency of the SSB, determining the transmit power of the SSB according to the neighboring-cell SSB configuration information comprises:

determining the transmit power of the SSB according to a frequency band where the frequency of the SSB is located, wherein different frequency bands correspond to different transmit power.

5. The method of claim 1, wherein the TCI state configuration information further contains a physical cell identifier (PCID) carried in the SSB, and the method further comprises:

determining the cell to which the SSB belongs according to the PCID carried in the SSB.

6. The method of claim 5, wherein determining the cell to which the SSB belongs according to the PCID carried in the SSB comprises:

determining that the SSB is an SSB of a serving cell when the PCID carried in the SSB is the same as a PCID of the serving cell; and determining that the SSB is an SSB of a neighboring cell when the PCID carried in the SSB is different from the PCID of the serving cell.

7. The method of claim 1, wherein when the neighboring-cell SSB configuration information contains indication information of a subcarrier spacing of the SSB, determining the transmit power of the SSB according to the neighboring-cell SSB configuration information comprises:

determining the transmit power of the SSB according to the subcarrier spacing of the SSB.

8. The method of claim 1, wherein when the neighboring-cell SSB configuration information contains indication information of a half frame where the SSB is located, determining the transmit power of the SSB according to the neighboring-cell SSB configuration information comprises: determining the transmit power of the SSB according to the half frame where the SSB is located, wherein an SSB in a first half-frame and an SSB in a second half-frame use different transmit power; or when the neighboring-cell SSB configuration information contains indication information of a sub-frame where the SSB is located, determining the transmit power of the SSB according to the neighboring-cell SSB configuration information comprises: determining the transmit power of the SSB according to the sub-frame where the SSB is located, wherein SSBs in different sub-frames use different transmit power.

9. A terminal device comprising:

a transceiver;

a memory storing computer-executable instructions; and a processor coupled to the transceiver and the memory and configured to execute the computer-executable instructions to enable the transceiver to:

receive transmission configuration indication (TCI) state configuration information of a channel state information-reference signal (CSI-RS), the TCI state configuration information containing indication information of a synchronization signal block (SSB) quasi co-located with the CSI-RS; and wherein the processor is further configured to execute the computer-executable instructions to:

determine transmit power of the CSI-RS according to a cell to which the SSB belongs;

wherein the processor configured to execute the computer-executable instructions to determine the transmit power of the CSI-RS according to the cell to which the SSB belongs is configured to execute the computer-executable instructions to:

determine transmit power of the SSB from serving-cell configuration information when the SSB is an SSB of a serving cell, and determine the transmit power of the SSB according to neighboring-cell SSB configuration information when the SSB is an SSB of a neighboring cell, wherein the transmit power of the SSB is configured through the neighboring-cell SSB configuration information; and determine the transmit power of the CSI-RS according to the transmit power of the SSB and a power offset between the CSI-RS and the SSB;

wherein the processor is further configured to execute the computer-executable instructions to:

determine receive power of the CSI-RS; and determine a path-loss estimation value according to the receive power of the CSI-RS and the transmit power of the CSI-RS.

10. The terminal device of claim 9, wherein the TCI state configuration information further contains neighboring-cell indication information;

wherein the processor is further configured to execute the computer-executable instructions to determine the cell to which the SSB belongs according to the neighboring-cell indication information.

11. The terminal device of claim 9, wherein the processor configured to determine the transmit power of the SSB according to the neighboring-cell SSB configuration information is configured to:

determine the transmit power of the SSB according to a power offset between a neighboring-cell SSB and a serving-cell SSB and the transmit power of the SSB of the serving cell, when the neighboring-cell SSB configuration information contains the power offset between the neighboring-cell SSB and the serving-cell SSB.

12. The terminal device of claim 9, wherein the processor configured to determine the transmit power of the SSB according to the neighboring-cell SSB configuration information is configured to:

determine the transmit power of the SSB according to a frequency band where a frequency of the SSB is located, when the neighboring-cell SSB configuration information contains indication information of the frequency of the SSB, wherein different frequency bands correspond to different transmit power.

13. The terminal device of claim 9, wherein the processor configured to execute the computer-executable instructions to determine the transmit power of the SSB according to the neighboring-cell SSB configuration information is configured to execute the computer-executable instruction to determine the transmit power of the SSB according to a subcarrier spacing of the SSB when the neighboring-cell SSB configuration information contains indication information of the subcarrier spacing of the SSB.

14. The terminal device of claim 9, wherein the processor configured to execute the computer-executable instructions to determine the transmit power of the SSB according to the neighboring-cell SSB configuration information is configured to execute the computer-executable instruction to:

determine, when the neighboring-cell SSB configuration information contains indication information of a half frame where the SSB is located, the transmit power of the SSB according to the half frame where the SSB is located, wherein an SSB in a first half-frame and an SSB in a second half-frame use different transmit power; or determine, when the neighboring-cell SSB configuration information contains indication information of a sub-frame where the SSB is located, the transmit power of the SSB according to the sub-frame where the SSB is located, wherein SSBs in different sub-frames use different transmit power.

15. A network device comprising:

a transceiver;

a memory storing computer-executable instructions; and a processor coupled to the transceiver and the memory and configured to execute the computer-executable instructions to enable the transceiver to:

transmit transmission configuration indication (TCI) state configuration information of a channel state information-reference signal (CSI-RS), the TCI state configuration information containing indication information of a synchronization signal block (SSB) quasi co-located with the CSI-RS and being used to determine transmit power of the CSI-RS;

wherein transmit power of the SSB is determined according to a cell to which the SSB belongs, and transmit power of the CSI-RS is determined according to the transmit power of the SSB and a power offset between the CSI-RS and the SSB;

wherein the transmit power of the SSB is determined from serving-cell configuration information when the SSB is an SSB of a serving cell, and the transmit power of the SSB is determined according to neighboring-cell SSB configuration information when the SSB is an SSB of a neighboring cell, wherein the transmit power of the SSB is configured through the neighboring-cell SSB configuration information;

wherein receive power of the CSI-RS is determined through measurement, and a path-loss estimation value is determined according to the receive power of the CSI-RS and the transmit power of the CSI-RS.

16. The network device of claim 15, wherein the TCI state configuration information further contains neighboring-cell indication information, wherein the neighboring-cell indication information is used to determine the cell to which the SSB belongs.

17. The network device of claim 15, wherein the transmit power of the SSB is determined according to the transmit power of the SSB of the serving cell and a power offset between a neighboring-cell SSB and a serving-cell SSB in the neighboring-cell SSB configuration information.

18. The network device of claim 15, wherein a path-loss estimation value is determined according to receive power of the CSI-RS and the transmit power of the CSI-RS.

* * * * *